(12) United States Patent
Otto et al.

(10) Patent No.: US 9,291,285 B2
(45) Date of Patent: Mar. 22, 2016

(54) FLUIDIC ACTUATOR COMPRISING DEFORMABLE SEAL ARRANGEMENT AND LONG STORABILITY

(71) Applicants: Fraunhofer-Gesellschaft zur Foerderung der angewandten Forschung e.V., Munich (DE); Technische Universitaet Chemnitz, Chemnitz (DE)

(72) Inventors: Thomas Otto, Koethensdorf (DE); Joerg Nestler, Chemnitz (DE); Thomas Gessner, Chemnitz (DE)

(73) Assignees: Fraunhofer-Gesellschaft zur Foerderung der angewandten Forschung e.V., Munich (DE); Technische Universitaet Chemnitz, Chemnitz (DE)

( * ) Notice: Subject to any disclaimer, the term of this patent is extended or adjusted under 35 U.S.C. 154(b) by 56 days.

(21) Appl. No.: 13/901,109

(22) Filed: May 23, 2013

(65) Prior Publication Data

US 2013/0255812 A1 Oct. 3, 2013

Related U.S. Application Data

(63) Continuation of application No. PCT/EP2011/070061, filed on Nov. 14, 2011.

(30) Foreign Application Priority Data

Nov. 24, 2010 (DE) .......................... 10 2010 061 909

(51) Int. Cl.
*F16K 31/02* (2006.01)
*F16K 99/00* (2006.01)
(Continued)

(52) U.S. Cl.
CPC ............. *F16K 99/0065* (2013.01); *B23P 19/00* (2013.01); *F04B 19/006* (2013.01);
(Continued)

(58) Field of Classification Search
CPC ... F16K 99/0065; F16K 99/015; B23P 19/00; F04B 19/006; F04B 43/043; F04B 43/0054; Y10T 137/2191; Y10T 137/2218; Y10T 29/49412; F05C 2231/00
USPC ........................................................ 417/413.2
See application file for complete search history.

(56) References Cited

U.S. PATENT DOCUMENTS 3,739,573 A 6/1973 Giner
5,233,459 A * 8/1993 Bozler et al. .................. 359/230
(Continued)

FOREIGN PATENT DOCUMENTS

CN 101583797 A 11/2009
CN 101622743 A 1/2010
(Continued)

OTHER PUBLICATIONS

Goldschmidtbong, F, A novel self-heating paraffin membrane microactuator, Jan. 2008, IEEE, MEMS 2008. IEEE 21st International conference on Micro Electro Mechanical Systems, 2008. Print ISBN 978-1-4244-1792-6, pp. 531-534.*
(Continued)

*Primary Examiner* — John K Fristoe, Jr.
*Assistant Examiner* — Umashankar Venkatesan
(74) *Attorney, Agent, or Firm* — Keating & Bennett, LLP

(57) ABSTRACT

A fluidic actuator includes a basic arrangement having at least one cavity formed therein, an activatable substance within the cavity, and a deformable seal arrangement. The activatable substance, exemplarily an electrolyte, may be converted, at least partly, by suitable activation and thus cause a change in pressure in the cavity. The deformable seal arrangement serves for sealing the cavity. The seal arrangement includes an element containing paraffin and may be deformed when activating the activatable substance due to the change in pressure of the activatable substance. A corresponding method of manufacturing includes the following steps: providing the basic arrangement; forming a cavity, which is open on at least one side, in the basic arrangement; introducing the activatable substance into the cavity; and sealing the cavity using the deformable seal arrangement which includes an element containing paraffin.

22 Claims, 12 Drawing Sheets

(51) Int. Cl.
  *F04B 19/00* (2006.01)
  *F04B 43/00* (2006.01)
  *F04B 43/04* (2006.01)
  *B23P 19/00* (2006.01)

(52) U.S. Cl.
  CPC .......... *F04B 43/0054* (2013.01); *F04B 43/043* (2013.01); *F16K 99/0015* (2013.01); *F05C 2231/00* (2013.01); *Y10T 29/49412* (2015.01); *Y10T 137/2191* (2015.04); *Y10T 137/2218* (2015.04)

(56) References Cited

U.S. PATENT DOCUMENTS

| | | | |
|---|---|---|---|
| 5,238,223 A * | 8/1993 | Mettner et al. | 251/368 |
| 6,629,826 B2 * | 10/2003 | Yoon et al. | 417/393 |
| 8,580,209 B2 | 11/2013 | Kurowski et al. | |
| 2002/0037221 A1 | 3/2002 | Mastrangelo et al. | |
| 2002/0100888 A1 * | 8/2002 | Sharma et al. | 251/11 |
| 2002/0117643 A1 * | 8/2002 | Winger et al. | 251/129.06 |
| 2003/0156953 A1 | 8/2003 | Chinn et al. | |
| 2004/0007275 A1 * | 1/2004 | Hui Liu et al. | 137/828 |
| 2004/0011977 A1 * | 1/2004 | Hower et al. | 251/11 |
| 2004/0094733 A1 * | 5/2004 | Hower et al. | 251/11 |
| 2004/0234401 A1 | 11/2004 | Banister | |
| 2005/0116798 A1 * | 6/2005 | Bintoro et al. | 335/78 |
| 2005/0287020 A1 * | 12/2005 | Lee et al. | 417/413.2 |
| 2007/0295605 A1 | 12/2007 | Park et al. | |
| 2008/0098917 A1 | 5/2008 | Rikihisa et al. | |
| 2008/0245984 A1 * | 10/2008 | Furukawa et al. | 251/129.01 |
| 2009/0074595 A1 | 3/2009 | Chen et al. | |
| 2010/0099020 A1 | 4/2010 | Ouwerkerk et al. | |
| 2010/0145272 A1 | 6/2010 | Cefai et al. | |
| 2011/0135546 A1 | 6/2011 | Kurowski et al. | |
| 2012/0085949 A1 * | 4/2012 | Chen et al. | 251/129.01 |
| 2012/0113497 A1 | 5/2012 | Woias et al. | |

FOREIGN PATENT DOCUMENTS

| | | |
|---|---|---|
| DE | 27 16 299 A1 | 10/1978 |
| DE | 42 23 019 C1 | 11/1993 |
| DE | 10 2006 017 482 A1 | 10/2007 |
| DE | 10 2009 018 365 A1 | 11/2010 |
| EP | 2 138 233 A1 | 12/2009 |

OTHER PUBLICATIONS

Official Communication issued in International Patent Application No. PCT/EP2011/070061, mailed on Feb. 21, 2012.

Moreno et al., "A Novel Single-Use SU-8 Microvalve for Pressure-Driven Microfluidic Applications," Journal of Micromechanics and Microengineering, vol. 20, 2010, pp. 1-11.

* cited by examiner

FLUIDIC ACTUATOR COMPRISING DEFORMABLE SEAL ARRANGEMENT AND LONG STORABILITY

CROSS-REFERENCE TO RELATED APPLICATIONS

This application is a continuation of copending International Application No. PCT/EP2011/070061, filed Nov. 14, 2011, which is incorporated herein by reference in its entirety, and additionally claims priority from German Application No. 102010061909.4, filed Nov. 24, 2010, which is also incorporated herein by reference in its entirety.

BACKGROUND OF THE INVENTION

Microfluidic systems frequently necessitate actuators in the form of pumps and/or valves which control the transport of liquids through channels or channel systems. Such actuators may exemplarily be embodied such that a gas which acts directly or indirectly on a fluid in a channel or channel system is generated in a liquid (such as, for example, water) via an electrochemical reaction. Such an actuator liquid may exemplarily be an electrolyte wherein electrolysis is performed so as to achieve the actuator effect. When the electrolyte is a water-based electrolyte, hydrogen and oxygen gas, the gas pressure of which imparts an actuator effect, may exemplarily be generated by means of water electrolysis.

One problem here is that the liquid wherein a gas is to be generated electrochemically is present in the system in very small quantities and may evaporate quickly, thereby limiting the storability of the systems.

It is irrelevant for evaporation and, thus, the present invention whether the electrolyte is really present in a liquid state or is modified (such as, e.g., concentrated as a gel, etc.) in its state.

At the same time, the advantage of such an electrochemical actuator, i.e. displacing relatively large volumes by the great gas volume, is to be maintained. This means that the liquid in the actuator may not be sealed using a very thick or dense film. On the other hand, polymer films of low water vapor permeability, as are, for example, frequently used for drug packs, exhibit very high yield stress and only very low expandability.

When using an electrolyte containing water for the electrochemical actuator, water vapor permeability has to be very low, whereas the advantage of the great gas volume generated is to be maintained to the best degree possible. Conventional materials, like, for example, nearly all elastomers (which basically allow high expandability), but also most other plastic films, however, exhibit high permeability relative to water vapor. Technically, metallizations on or in these materials are also used frequently so as to reduce water vapor permeability. However, with the large expansion capabilities necessitated for the films at the same time, such a metallization would result in tears such that a stable barrier function could not be ensured. Thus, the invention aims at encapsulating an electrolyte, which generally contains water, such that the advantages of the great gas volume generated, compared to the actuator volume at normal pressure, can be maintained to the best degree possible, but at least are not reduced to such a degree that the actuator function can no longer be ensured.

SUMMARY

According to an embodiment, a fluidic actuator may have: a basic arrangement having at least one cavity formed therein; an activatable substance within the cavity, configured to be converted, at least partly, by means of suitable activation and thus cause a change in pressure in the cavity; and a deformable seal arrangement for sealing the at least one cavity, wherein the seal arrangement includes a film having a paraffin portion or an expandable film having a paraffin layer on at least one main surface and may be deformed when activating the activatable substance due to the change in pressure.

According to another embodiment, a method for manufacturing a fluidic actuator may have the steps of: providing a basic arrangement; forming a cavity, open on at least one side, in the basic arrangement; introducing an activatable substance into the cavity, configured to be converted, at least partly, by suitable activation and thus cause a change in pressure in the cavity; and sealing the cavity using a deformable seal arrangement which includes a film having a paraffin portion or an expandable film having a paraffin layer on at least one main surface and may be deformed when activating the activatable substance due to the change in pressure.

In accordance with the teaching disclosed here, an activatable substance (exemplarily an electrolyte) is sealed at least on one side by a material or a material combination which consists, at least partly, of paraffin. Paraffin exhibits a low water vapor permeation coefficient.

In accordance with embodiments of the present invention, a fluidic actuator is provided. The fluidic actuator includes a basic arrangement comprising at least one cavity formed therein, an activatable substance within the cavity, and a deformable seal arrangement for sealing the cavity. The activatable substance is configured or selected such that it may be converted at least partly by means of suitable activation and thus causes a change in pressure in the cavity. The activation may take place through different external influences, wherein applying an electrical voltage, a change in temperature or radiation of certain characteristics are to be mentioned exemplarily. The deformable seal arrangement seals the cavity such that, in cooperation with other boundaries of the cavity, such as, for example, walls and the floor of the cavity, the cavity usually is liquid-tight and/or gas-tight relative to its surroundings. The deformable seal arrangement includes an element containing paraffin. In addition, the deformable seal arrangement is configured to be deformed when activating the activatable substance, due to the change in pressure of the activatable substance. Deformation may, for example, be of a plastic or elastic nature. With elastic deformation, the seal arrangement will return to its original shape, as soon as the activatable substance returns to its starting state after the activation subsides or deactivation.

The deformation of the deformable seal arrangement may be made use of for the mode of functioning of the fluidic actuator since the deformation also entails an, at least partial, movement of the seal arrangement, using which an element or material which is situated outside the seal arrangement may be manipulated. The deformable seal arrangement may thus be considered to be the active element of the fluidic actuator. By using paraffin in the deformable seal arrangement or in parts or elements thereof, the seal arrangement may, on the one hand, be made sufficiently deformable for the fluidic actuator to be able to achieve an actuator effect of a desired intensity and, on the other hand, sufficiently impermeable relative to the activatable substance or components thereof.

In accordance with embodiments, the element containing paraffin may be a film comprising a paraffin portion. In a film material used for the film, for example, a paraffin portion may exemplarily also be introduced when manufacturing the film.

Frequently, the activatable substance is selected such that, when activated, it changes its state of aggregation at least partly, exemplarily from a liquid to a gaseous state. The change in the state of aggregation may also take place by converting the activatable substance at least partly to one or several different substances. The seal arrangement is deformed due to a change in pressure within the cavity. Mostly, starting at a state of rest of the fluidic actuator in the cavity, the pressure is increased by the activation such that the deformable seal arrangement deforms or curves outwards due to the increase in pressure.

In accordance with further embodiments, the element containing paraffin may be a paraffin layer. Furthermore, the seal arrangement may include an expandable film and the paraffin layer may be arranged on at least one main surface of the expandable film. Exemplarily, the expandable film is covered with the paraffin layer. An elastomer layer may be provided above or below the paraffin layer, instead of a film. Such an elastomer layer may be produced during manufacturing of the seal arrangement, exemplarily by applying same, whereby a good mechanical connection between the elastomer layer and the paraffin layer may be achieved. The layer containing, at least partly, paraffin may exemplarily include hard paraffin.

In accordance with embodiments, the expandable film may consist of one of the following materials: natural rubber, silicone rubber, butyl rubber and polybutadiene. These materials exhibit good expandability and, partly, also elasticity such that a change in pressure forming in the cavity may be converted to a relatively great deformation and deflection of the expandable film.

In accordance with embodiments, the paraffin layer may be arranged in the region of the cavity of the expandable film, maybe exclusively in this area, at least basically. The area of the cavity here may be defined such that it results from an extension of the cavity in the direction of a direction, normal to surface, of the expandable film. With such an arrangement, a large part of the evaporation of the activatable substance through the expandable film may be prevented.

In contrast to the previous embodiment, in a different embodiment, the paraffin layer may be arranged on the expandable film basically over the entire area. This, among other things, allows simplifying the manufacturing process.

In accordance with embodiments, the paraffin layer may be applied onto the expandable film using one of the following methods: a printing process (by printing), dipping process, spraying process, spinning process, dripping process, dispensing process or a combination thereof. Depending on the type of the method used, the paraffin layer may be applied specifically onto the expandable film, exemplarily exclusively in selected areas or at a defined thickness and uniformly. Paraffin is suitable for the methods mentioned.

In accordance with embodiments, the element containing paraffin may be an elastomer layer provided with a paraffin layer.

The fluidic actuator may be an electrolytic actuator, activation of the activatable substance taking place by applying a voltage to two electrodes arranged in the cavity. The electrolyte used may be a water-based electrolyte which, when applying an electrical voltage, is decomposed (at least partly) to hydrogen and oxygen which both are present in a gaseous state and thus take up a greater volume than the electrolyte, still liquid, before performing electrolysis. Using this principle, a great change in volume of the electrolyte as the activatable substance may be achieved in a short time and using a relatively small amount of activation energy.

The activatable substance, or electrolyte, may be present in either a liquid form, a concentrated form, as a gel or in another form. The decrease in evaporation of the electrolyte and, in particular, of the water contained therein achieved in accordance with the teaching presented here may be achieved in many manifestations of the electrolyte such that using paraffin in the seal arrangement is possible, and beneficial, also with a condensed or gel-like electrolyte.

In accordance with embodiments, the seal arrangement exhibits a water vapor permeability of less than 10 $g/m^2/d$. A water vapor permeability of less than 5 $g/m^2/d$ or even less than 1 $g/m^2/d$ would be of advantage.

In embodiments, the seal arrangement comprises an expandability of more than 100%, relative to a state of rest or non-activated state. Advantageously, this value would be more than 200%, more than 300% or more than 500%.

In accordance with embodiments, the seal arrangement and, in particular, a film or layer used therein, exhibits a yield stress of less than 20 MPa, advantageously <10 MPa or even <5 MPa.

The paraffin may be applied directly onto the electrolyte, exemplarily by a dispensing process or printing process. In this case, a carrier film may be omitted. A suitable material may be added to the paraffin so as to achieve the deformability necessitated.

The element containing paraffin may comprise dimensions which are greater than the dimensions of an opening of the cavity to be sealed such that an edge of the element containing paraffin projects beyond the opening towards the outside. The element containing paraffin may be affixed to walls or areas enclosing the opening, by means of the edge. This allows improving the edge tightness since the activatable substance or electrolyte cannot escape through gaps between the element containing the paraffin and other bounding elements of the cavity.

In accordance with embodiments, the seal arrangement may comprise a groove pattern or a wave pattern. A groove or wave pattern comprises an increased actual area compared to the area it takes up in its original state. This means that a groove or wave pattern may be deformed using a relatively small action of force or pressure, at least in a predetermined deforming direction, since only the grooves or waves are pulled apart or made flatter. This means that the seal offers relatively low resistance to the gas pressure. Circular, quadratic, rectangular or oval arrangements of grooves or waves, as well as other conceivable arrangements, also fall under the principle of a groove or wave pattern. Such a patterning of the seal arrangement allows maintaining easy deformability, maybe up to complete extension.

In accordance with embodiments, connected thereto, the seal arrangement may include a membrane consisting of at least one of the following materials: metal, thermal plastic, thermosetting plastic and/or elastomer. Additionally, the membrane may be provided with a layer, at least partly containing paraffin, as the element containing paraffin.

The cavity may be formed of a floor element and a patterned adhesive tape or patterned film, wherein the seal arrangement also forms and bounds the cavity. The floor element may exemplarily be a printed circuit board. Different configurations of the cavity may be provided easily when using a patterned film or patterned adhesive tape. In particular, the floor element comprising the patterning component mentioned may be pre-manufactured.

The fluidic actuator may include at least another cavity which is separated from the cavity mentioned before by the seal arrangement. The other cavity may exemplarily be a channel or a reservoir of a micro-fluidic system. In this way, the fluidic actuator is able to control or cause movement of a fluid in the channel or reservoir by activating the fluidic actuator, i.e. by suitably activating the activatable substance.

The fluidic actuator may include several actuator units. In this case, the fluidic actuator includes a plurality of cavities which are formed in the basic arrangement. A plurality of seal arrangement are configured such that they each seal one of the plurality of cavities. With such a configuration, the seal arrangements may either be formed separately, or the plurality of the seal arrangements may be formed as a continuous seal unit. The continuous seal unit may exemplarily be a film arranged over the plurality of cavities and connected to the basic arrangement in ad edge area of each cavity such that a tight connection is formed between the respective seal arrangement and the lateral walls of the corresponding cavity.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
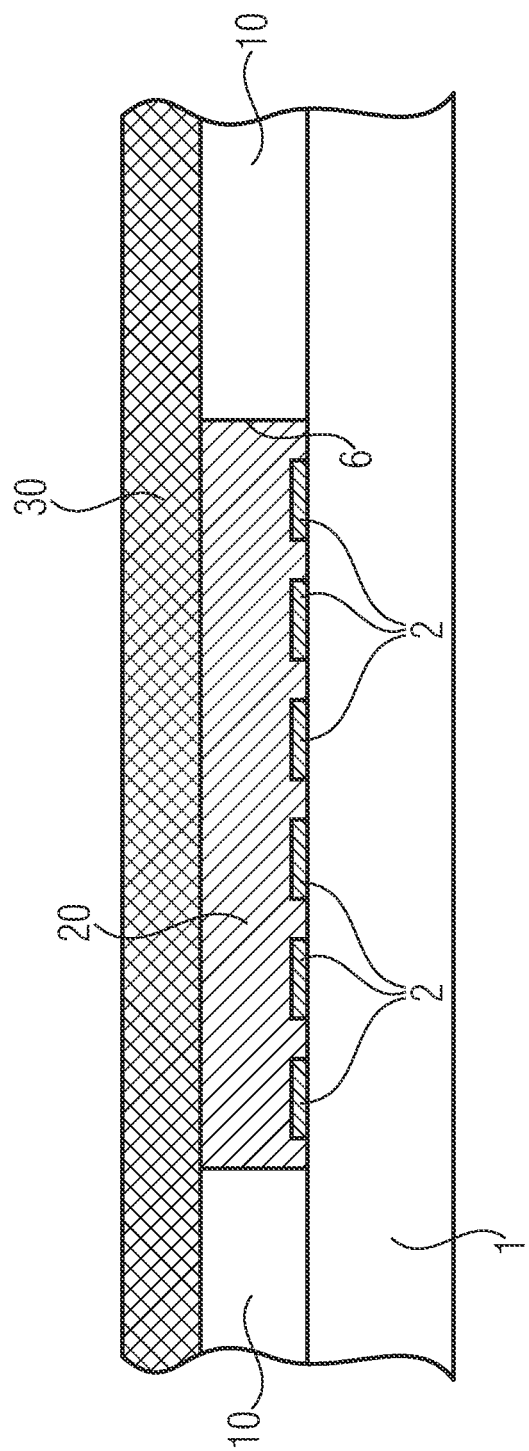
FIG. 1a is a schematic sectional view of an electrochemical actuator in accordance with a first embodiment in a starting state.
Figure 1B:
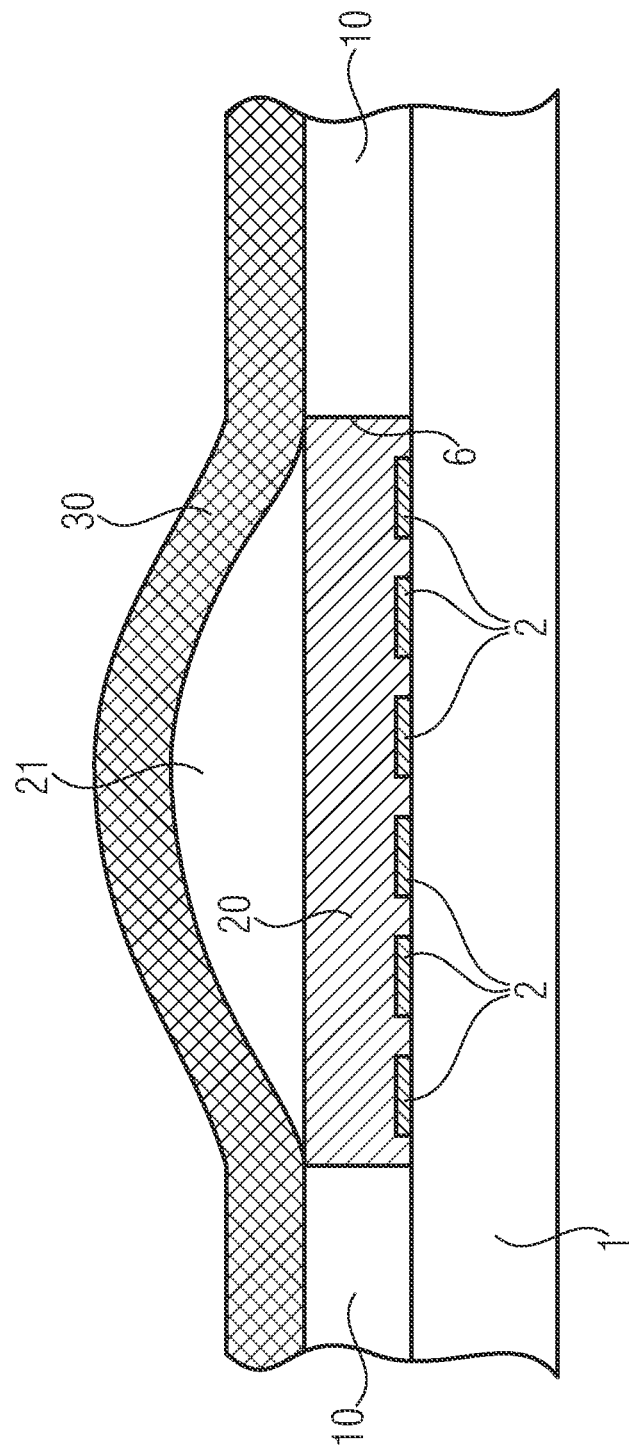
FIG. 1b is a schematic cross-sectional view of the electrochemical actuator of FIG. 1 in an activated state.

FIGS. 1a and 1b show an electrochemical actuator in accordance with a first embodiment in two different states. FIG. 1a shows the electrochemical actuator in a starting state or state of rest. The starting state usually corresponds to the non-activated state of the actuator and in many cases of application the actuator is used such that it will remain in the starting state over a long period of time before being activated (shelf life). In the embodiments illustrated in FIGS. 1a and 1b, the actuator includes a substrate 1 which may be of a plate-like shape. A number of further parts of the actuator are arranged on one of the two main surfaces such a plate-like substrate 1 has. Among these parts are the lateral walls 10 which laterally bound a cavity 6 of the actuator. A lower boundary of the cavity 6 is formed by the substrate 1, as defined by a floor element. The substrate 1 and the lateral walls 10 together form a basic arrangement of the actuator wherein the cavity 6 is formed. The basic arrangement of the actuator illustrated in FIGS. 1a and 1b as consisting of several parts may in alternative embodiments also be formed integrally and may exemplarily include only the substrate 1, but not the lateral walls 10 as separate elements. In this case, the cavity 6 would be formed by a recess in the substrate 1. This may take place in many ways, exemplarily by means of milling or etching. Irrespective of whether the basic arrangement is integral or composed of several parts, the cavity 6 is bounded by the basic arrangement on nearly all sides. In the first embodiment, the top of the cavity 6 is an exception. Bounding of the cavity 6 at the top is ensured by a seal arrangement which will be described in greater detail below.

The substrate 1 may, for example, be a printed circuit board. The lateral walls 10 forming the cavity 6 for an electrolyte 20 may exemplarily be a patterned film or patterned adhesive tape. Exemplarily, the electrolyte 20 is a water-based electrolyte, a hydrogel, etc. In the area of the cavity 6, electrodes 2 are formed on the main surface of the substrate 1 facing the cavity 6, wherein different electrical potentials may be applied selectively to the electrodes during operation of the actuator such that an electrical potential difference, i.e. an electrical voltage, forms within the cavity 6 and the electrolyte 20. The electrolyte 20 reacts to the electrical voltage applied with a chemical reaction which usually results in splitting or decomposition of the electrolyte into its chemical components. Depending on the type of electrolyte used, gaseous electrolysis products, which are of a lower density than the electrolyte in the starting state and thus would necessitate a greater volume at constant pressure, may form here. Since increasing the volume cannot be performed easily due to the sealed cavity 6, what results is an increase in pressure within the cavity 6. The increase in pressure in turn causes an increased force on the boundary walls of the cavity 6. Conventionally, the substrate 1 and the lateral walls 10 are formed to be sufficiently rigid such that the increased force action results only in an insignificant deformation of the substrate 1 and the lateral walls 10.

At the top, the cavity 6 is bounded by a seal arrangement 3. In the first embodiment in accordance with FIGS. 1a and 1b, the seal arrangement 3 includes a membrane 30 which, at least partly, contains paraffin. The material used for the membrane 30 may exemplarily be a film material into which a paraffin portion has been introduced already during manufacturing. Examples of suitable material are: Parafilm® M, Parafilm® Grafting Tape, Parafilm® Florist Stem Wrap, Parafilm® Floratape, Nescofilm (manufacturer: Bando Chemical Ind. Ltd.) and comparable products. Such products usually consist of paraffins and olefins. In commercially available film thicknesses, such film materials exhibit water vapor permeabilities of <1 g/m$^2$/d, whereas they exhibit yield stress of less than 5 MPa at expandabilities of several 100%. As membranes 30 for an electrochemical actuator in accordance with the teaching presented here, these are deformed through the gas pressure in a plastic manner.

FIG. 1b shows the electrochemical actuator after having generated a gas 21 electrochemically. The membrane 30 belonging to the seal arrangement 3 bends upwards caused by the gas pressure forming in the cavity 6, since same is much easier to deform compared to the substrate 1 and the lateral walls 10. The change in volume generated by the increased gas pressure in the cavity 6 causes a relatively large deflection of the membrane 30, in particular in the center of the membrane 30. In operation of the electrochemical actuator, this relatively large deflection of the membrane 30 may be made use of for mechanically driving other elements, for achieving a valve action or for driving a fluid which in FIGS. 1a and 1b is above the membrane 30.

Instead of an electrolyte, the cavity 6 may also be filled with another activatable substance which may be activated in a different manner than by electrochemical action. Exemplarily, water may be converted from its liquid state of aggregation at ambient temperature to the gaseous state of aggregation by means of thermal activation. However, actuators of mechanical/chemical action are also conceivable, wherein in the starting stage two chemical components are present within the cavity 6 separated from each other so as to be mixed with each other exemplarily by removing or destroying a separating wall between the two chemical components and start a chemical reaction resulting in a change in volume and pressure within the cavity 6. By introducing the paraffin portion into the material of the membrane 30, the seal arrangement 3 combines good deformability and little evaporation of the activatable substance or electrolyte 20 from the cavity 6. In this manner, a fluidic actuator equipped with such a membrane has a long shelf life, as regards composition and quantity of the activatable substance 20 within the cavity 6. When the membrane material used is elastic, deformation of the membrane is reversible, i.e. after terminating activation of the fluidic actuator, the activatable substance 20 may return to its starting state, thus shrinking to the original volume and also allowing the membrane 30 to return to its starting state illustrated in FIG. 1a. Alternatively, the actuator may be configured for being activated once, not returning its starting state after being activated.

Figure 2:
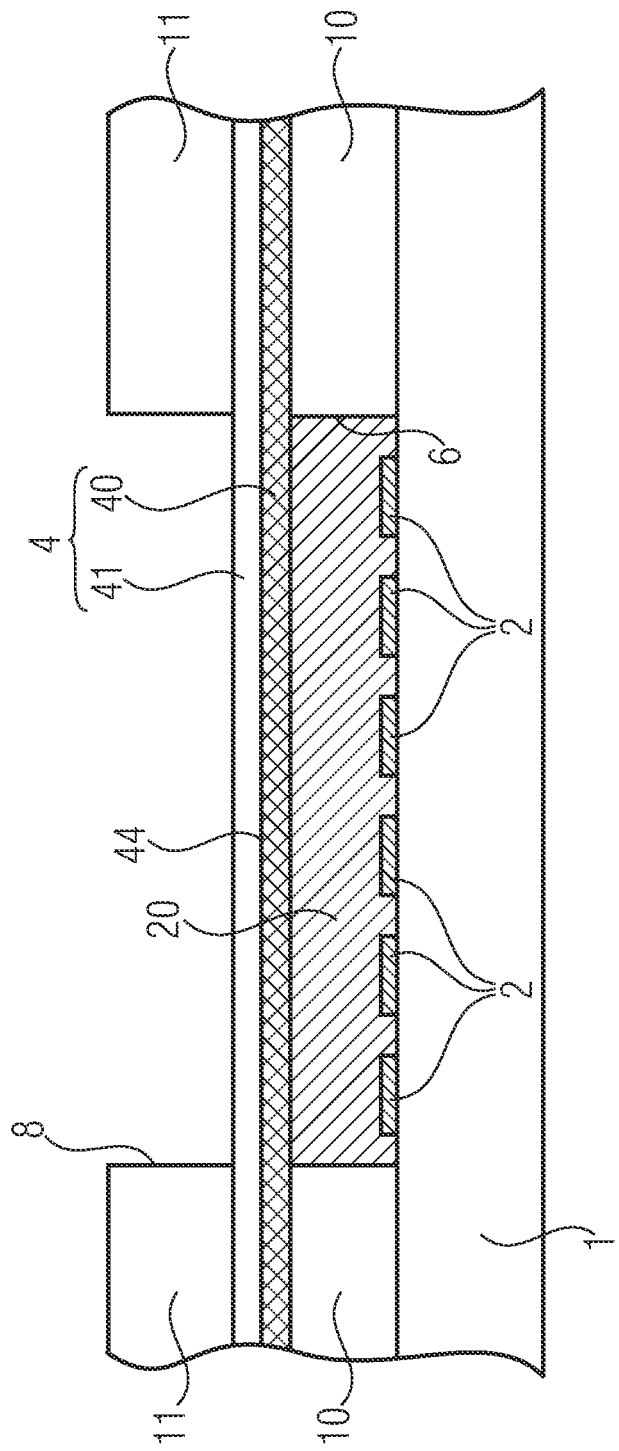
FIG. 2 is a schematic cross-section of an electrochemical actuator in accordance with a second embodiment.

FIG. 2 shows a schematic cross-section of a fluidic actuator in accordance with a second embodiment of the technical teaching disclosed here. In this second embodiment of an electrochemical actuator, the seal arrangement 4 includes a layer structure made of an elastomer layer or film and a layer, at least partly containing paraffin, for reducing water vapor permeation. The layer 40 at least partly containing paraffin is basically arranged over the entire area between the elastomer layer or film 41 and the electrolyte 20 and top boundary areas of the lateral walls 10. Thus, the layer at least partly containing paraffin or the paraffin layer 40 is present on a main surface 44 of the elastomer layer or film 41 and extends in parallel to said main surface. The elastomer layer or film 41 may generally be an expandable film 41 and include at least one of the following materials: natural rubber, silicone rubber, butyl rubber and polybutadiene. Other materials with comparable characteristics of expansion and elasticity may also be conceivable. The fluidic actuator shown in FIG. 2 also includes another cavity 8 which is arranged opposite to the cavity 6 relative to the seal arrangement 4. The cavity 8 in FIG. 2 is illustrated as a cavity open at the top, however may also be sealed by suitable elements. The cavity 8 is bounded laterally by lateral walls 11. A lower boundary of the cavity 8 is provided by the expandable film 41. The cavity 8 may be a channel or a reservoir in a microfluidic device. The effective cross-section of the cavity 8 in the area of the fluidic actuator may be varied using the fluidic actuator since, when activating the actuator, the seal arrangement 4 bends upwards and thus makes the cavity 8 smaller. In another implementation, the lateral walls 11 of the cavity 8 may be shaped such that the cavity 8 basically comprises a cross-sectional shape corresponding to the shape of the bent seal arrangement 4 in the activated state. The other cavity 8 may exemplarily be shaped as a semi-cylinder or arch. In this way, the cavity 8 may be locked by the fluidic actuator, thereby largely preventing flow-through of a fluid through the cavity 8.

Figure 3:
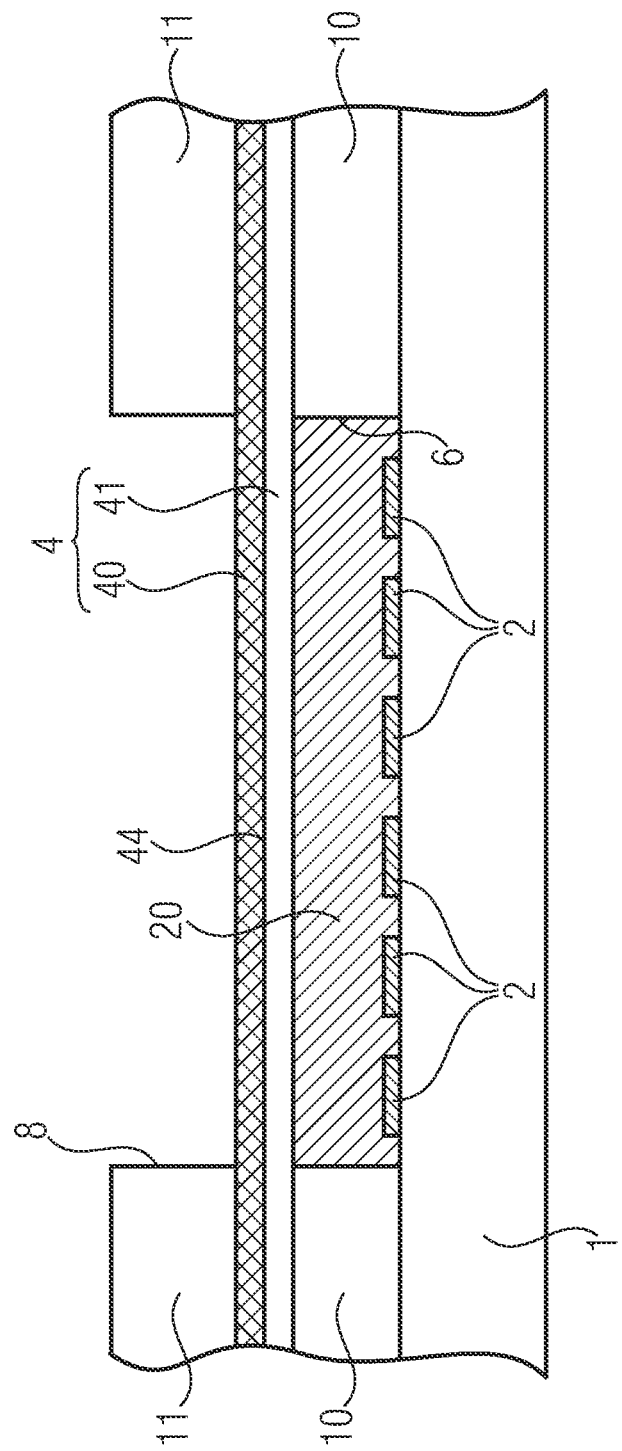
FIG. 3 is a schematic cross-section of an electrochemical actuator in accordance with a third embodiment, similar to the second embodiment.

FIG. 3 shows a third embodiment of a fluidic actuator which is largely similar to the second embodiment. In contrast to the second embodiment of FIG. 2, the order of layers within the seal arrangement 4 is changed in the third embodiment such that the paraffin layer 40 borders a top main surface 44 of the expandable film or layer 41. The decision for using either the second embodiment or the third embodiment may be influenced by the selection of a method for manufacturing the fluidic actuator in case that one or the other embodiment may be realized more easily and/or cheaper.

Figure 4:
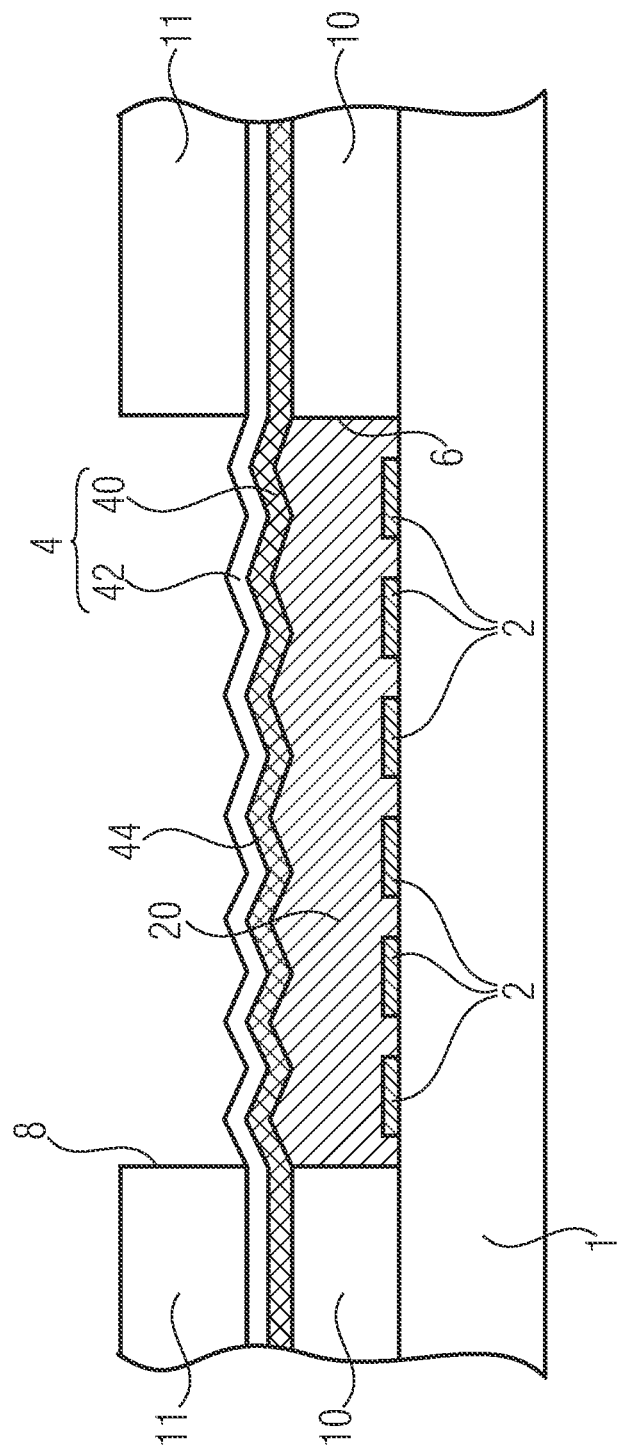
FIG. 4 is a schematic cross-section of an electrochemical actuator in accordance with a fourth embodiment, comprising a wave or groove seal arrangement.
Figure 5:
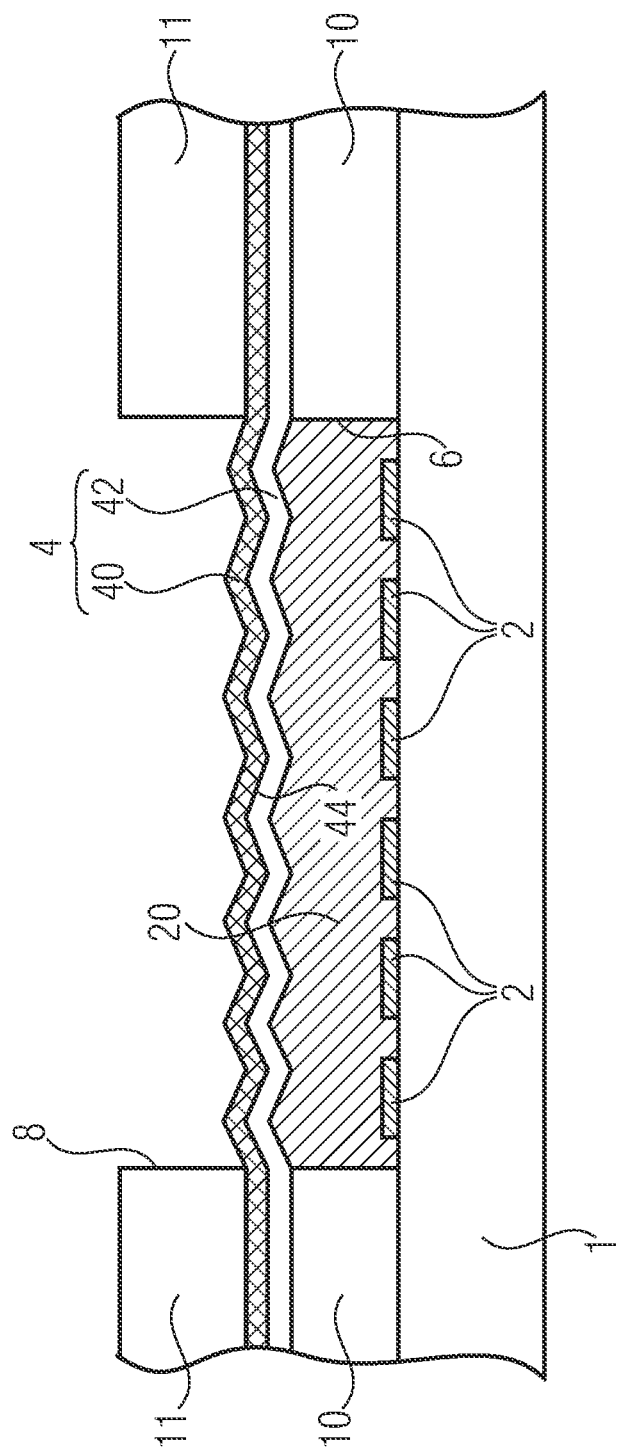
FIG. 5 is a schematic cross-section of an electrochemical actuator in accordance with a fifth embodiment, similar to the fourth embodiment.

FIGS. 4 and 5 show a fourth and a fifth embodiment of a fluidic actuator, respectively, in accordance with the technical teaching disclosed here. In particular, FIGS. 4 and 5 each show a schematic cross-section of a layer structure comprising an, at least partly, wave-shaped or groove-shaped film and a layer at least partly containing paraffin for reducing water vapor permeation.

In FIG. 4, the layer 40 at least partly containing paraffin is arranged between the activatable substance 20 and the expandable film 42. The expandable film or layer 42 comprises a groove or wave structure already in its state of rest, which is also transferred to the paraffin layer 40 and an interface between the paraffin layer 40 and the activatable substance 40. As in FIG. 2, the paraffin layer 2 is thus arranged on one of the two main surfaces 44 of the expandable film 42.

In FIG. 5, the order of the paraffin layer 40 and the expandable film 42 is reversed relative to FIG. 4, i.e. the expandable film 42 is arranged between the paraffin layer 40 and the activatable substance 20. The fifth embodiment in accordance with FIG. 5 thus basically corresponds to the third embodiment of FIG. 3, however with the difference that the seal arrangement exhibits the groove or wave pattern.

The groove or wave pattern for the seal arrangement may be selected when it is desired for the membrane (the seal arrangement 4) to offer as little resistance as possible to the gas pressure. This allows maintaining easy deformability up to a complete extension of the seal arrangement 4. Very rigid films made of the most different materials, such as, for example, metal, thermoplastics or thermosetting plastics or even elastomers, may be employed here for an inventive membrane. In accordance with the technical teaching disclosed here, these are provided, at least partly, with a layer at least partly containing paraffin.

Figure 6:
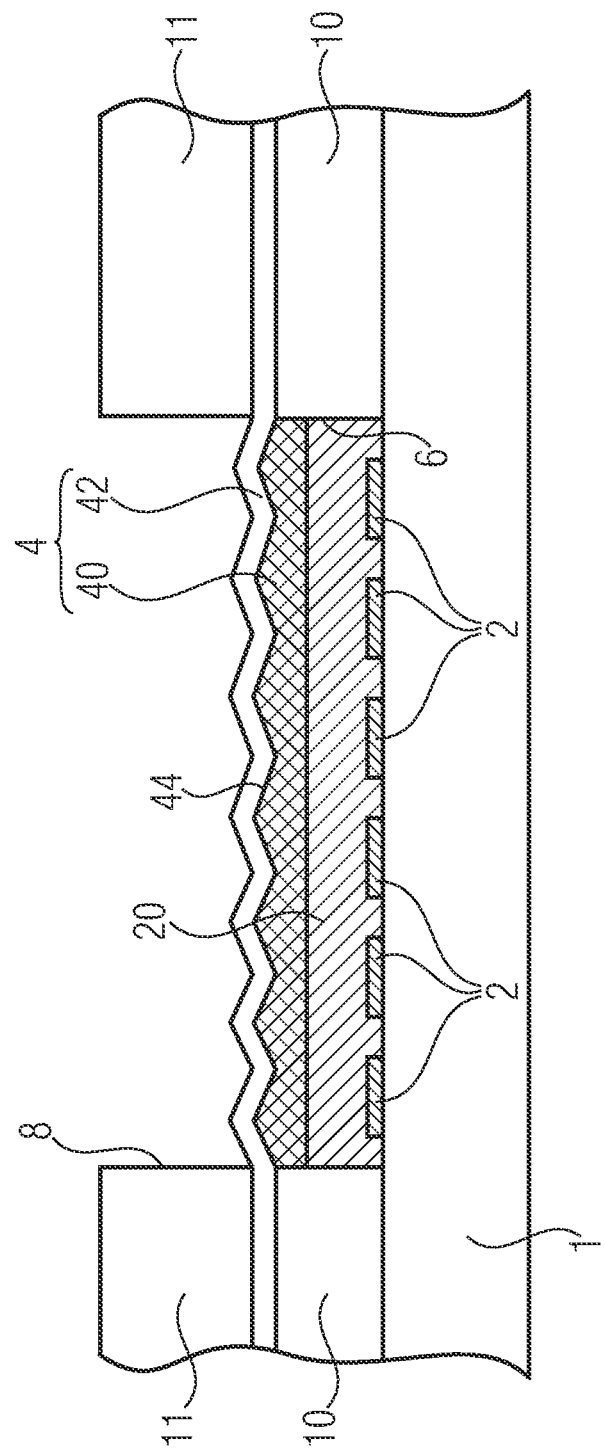
FIG. 6 is a schematic cross-section of an electrochemical actuator in accordance with a sixth embodiment, wherein a layer containing paraffin is deposited only in the area actually actuated.
Figure 7:
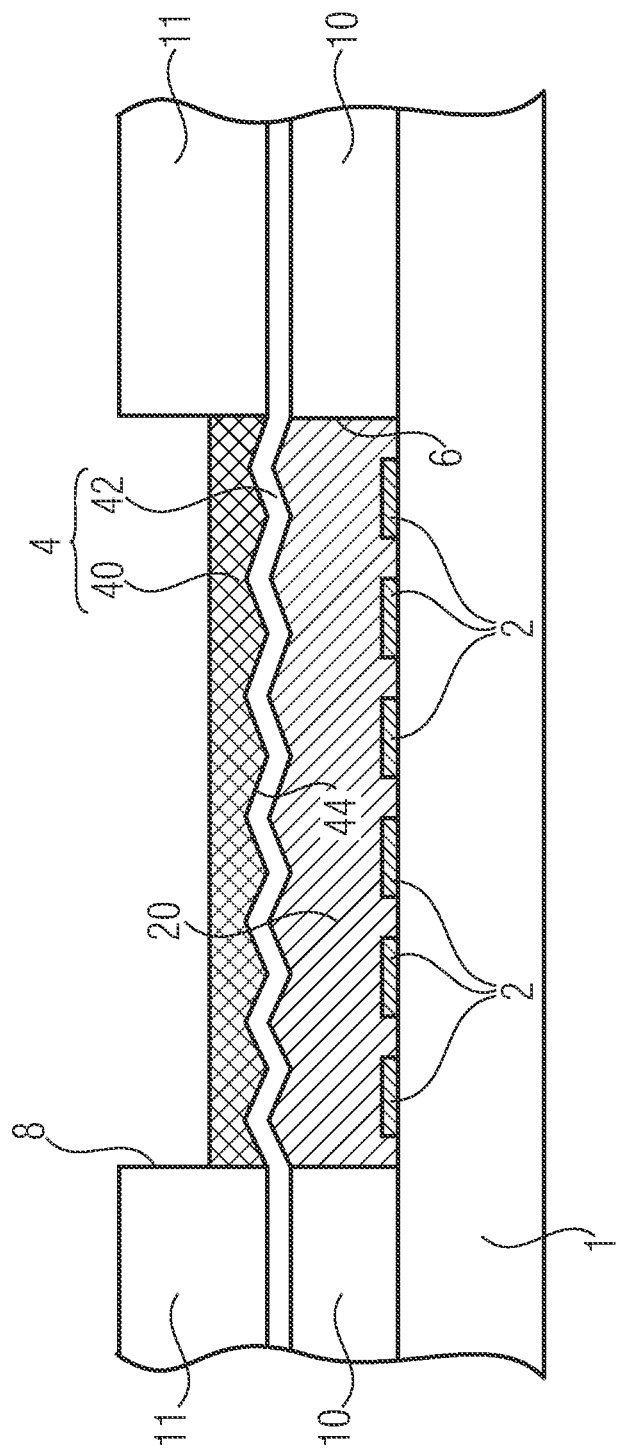
FIG. 7 is a schematic cross-section of an electrochemical actuator in accordance with a seventh embodiment, similar to the sixth embodiment.

FIGS. 6 and 7 show a sixth and a seventh embodiment of a fluidic actuator, respectively. The fluidic actuator is again illustrated in a schematic cross-section showing the layer structure made of an, at least partly, wave-shaped or groove-shaped film 42 and a layer 40 at least partly containing paraffin for reducing water vapor permeation. The layer at least partly containing paraffin is applied only in the area actually actuated. The area actually actuated is that area which, in accordance with the illustration in FIGS. 6 and 7, is above the cavity 6. Without the paraffin layer, a large part of the water or water vapor of the activatable substance 20 in this area would escape since the membrane is not as tight relative to water vapor as is the substrate 1 or the lateral walls 10. Thus, it may be useful to reduce water vapor permeability in particular in this area.

It is also possible to provide an elastomer layer or film (which really exhibits high water vapor permeability) (but also any other film of great expandability) with a paraffin layer so as to reduce water vapor permeability (see FIGS. 2 and 3). Thus, the paraffin layer 40 may be applied selectively only in the area of the electrolyte or also over the entire area. The paraffin here may be applied by different methods, such as, for example, but not exclusively, printing processes, spraying processes, spinning processes, dripping or dispensing.

In FIG. 6, the paraffin layer 40 bound to the area actually actuated is provided between the expandable film 42 and the activatable substance 20. The expandable film 42 comprises a groove or wave pattern as a patterning which is also transferred onto an interface between the expandable film 42 and the paraffin layer 40 which is located on the main surface 44 of the expandable film 42. An interface between the paraffin layer 40 and the activatable substance 20, in contrast, is essentially flat or plane. In contrast to the paraffin layer 40, the expandable film 42 continues beyond the edge of the cavity 6 defined by the lateral walls 10 in an outward direction. The expandable film 42, in this area outside the cavity 6, is sandwiched between the lateral walls 10 and 11. In this way, the expandable film 42 is affixed mechanically to the basic arrangement 1, 10, also when increasing the gas pressure in the cavity 6.

In FIG. 7, the order of the paraffin layer 40 and the expandable film 42 is reversed compared to FIG. 6 such that the expandable film or layer 42 is arranged between the paraffin layer 40 and the activatable substance 20. Since the expandable film 42 has no groove or wave structure, the interfaces to the paraffin layer (on the main surface 44 of the expandable film 42) and to the activatable substance 20 are also groove-shaped or wave-shaped. A top surface of the paraffin layer 40, in contrast, is basically plane. In the seventh embodiment illustrated in FIG. 7, too, the paraffin layer 40 is bound to the area of the cavity 6, i.e. the area actually actuated. The expandable film 42, in contrast, extends between the lateral walls 10 and 11, like in FIG. 6, so as to exemplarily provide for affixing the expandable film at the basic arrangement 1, 10.

Figure 8:
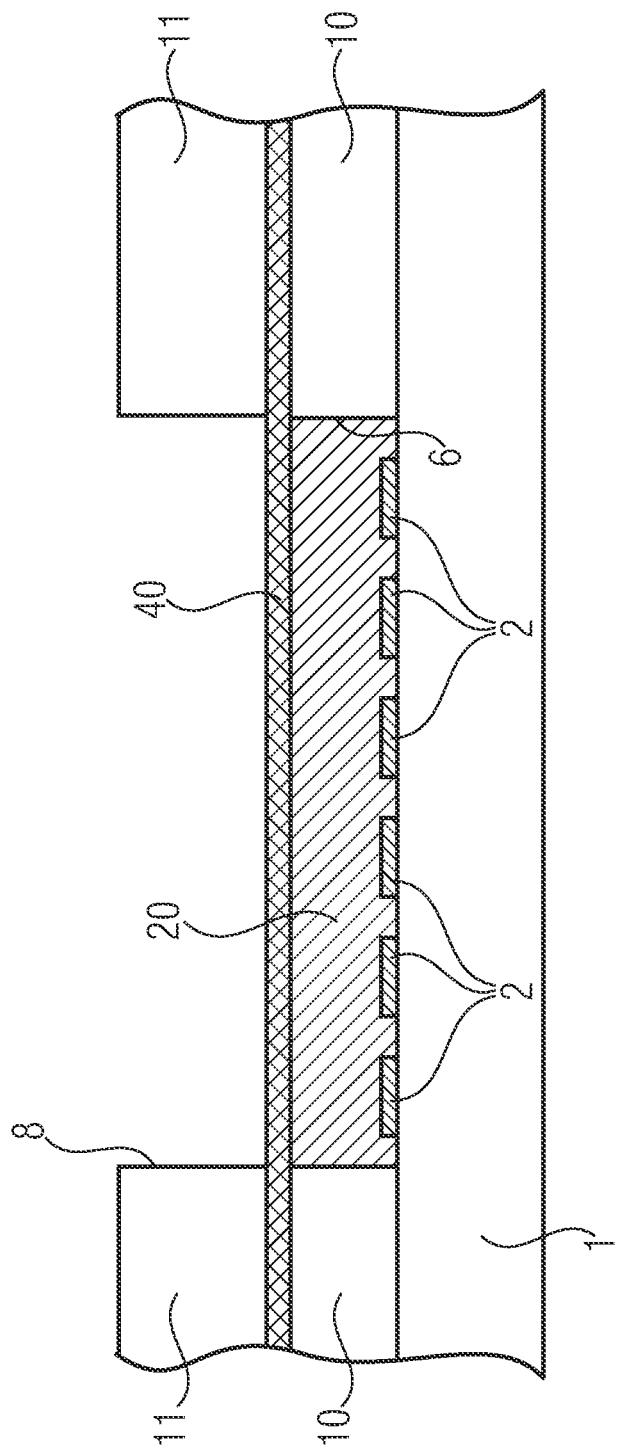
FIGS. 8-10 are schematic cross-sections of electrochemical actuators in accordance with further embodiments, wherein the seal arrangements include only a paraffin layer.
Figure 9:
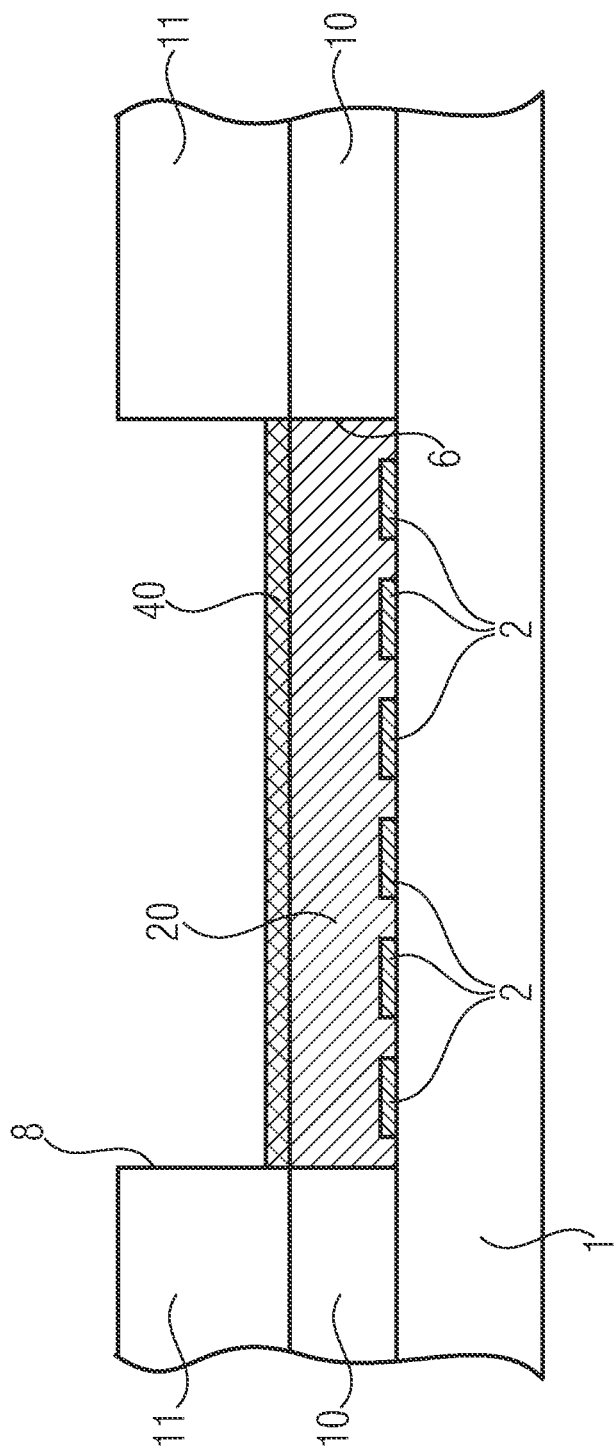
Figure 10:
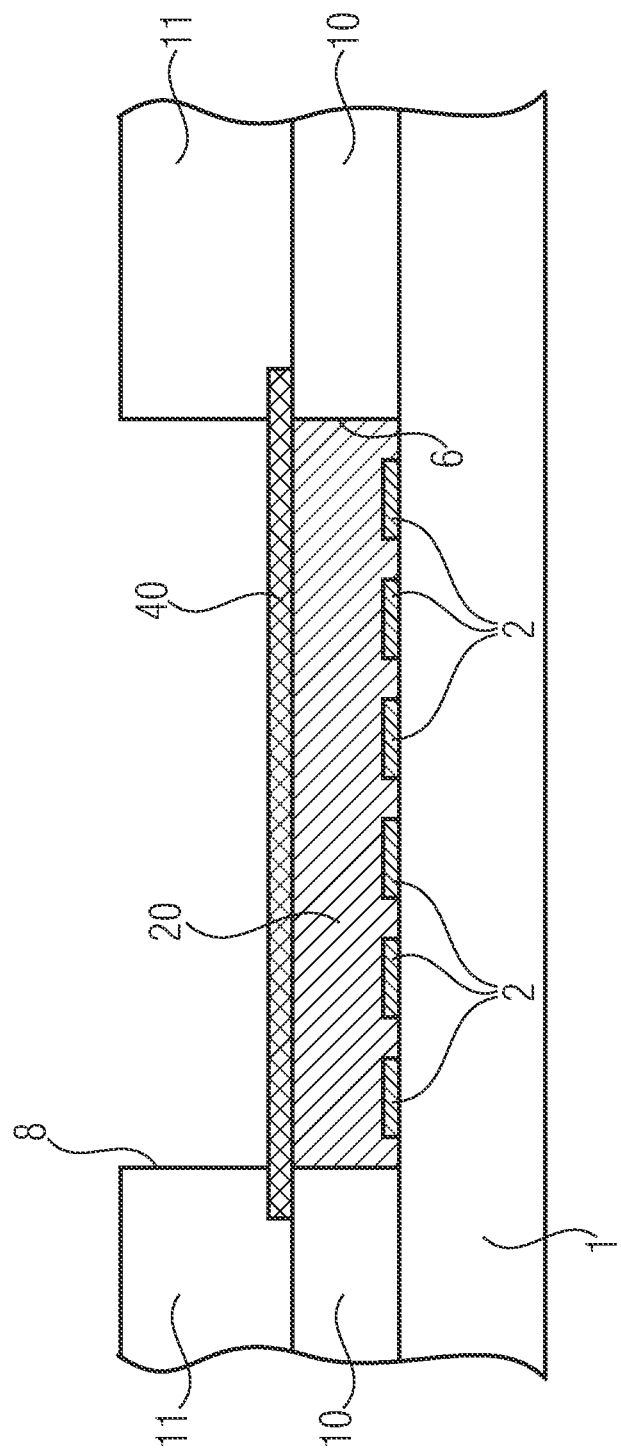

FIGS. 8 to 10 show embodiments wherein the cavity 6 is sealed exclusively using a paraffin layer 40. The paraffin layer 40 may exemplarily have been applied using printing or dispensing processes. Applying a paraffin here takes place directly on the electrolyte, for example by said dispensing or printing.

In FIG. 8, the paraffin layer 40 extends basically over the entire area of an intermediate layer provided by the fluidic actuator, extending above the lateral walls 10 and the cavity 6. Furthermore, the intermediate layer extends below the lateral walls 11. With regard to manufacturing technology, this may be done by at first providing the basic arrangement including the substrate 1 and lateral walls 10, and then filling the resulting cavity 6 with the activatable substance 20. What follows is applying the paraffin layer 40 over the entire area forming. Subsequently, the lateral walls 11 for the further cavity 8 are deposited onto the paraffin layer 40 at the positions provided for this.

In contrast to applying the paraffin layer 40 over the entire area, as shown in FIG. 8, the paraffin layer 40 in FIG. 9 is applied only in the area of the cavity 6. This selective application of the paraffin layer 40 may take place by means of corresponding masks or a type of screen printing method. The need for paraffin in the embodiment shown in FIG. 9 is less than for the embodiment shown in FIG. 8. Additionally, the lateral walls 10 and 11 in FIG. 9 are connected to each other directly and not, as is the case in FIG. 8, by means of the paraffin layer 40 there between. This may allow increasing the stability of the fluidic actuator.

FIG. 10 illustrates a configuration of the paraffin layer 40 which is a mixture of the embodiments of FIGS. 8 and 9. The paraffin layer 40 projects outwards beyond the area defined by the cavity 6 and thus forms a projecting edge comprising an interface with the basic arrangement 1, 10, in particular the lateral walls 10. This edge may exemplarily be provided in order for the paraffin layer 40, when deforming as a consequence of a suitable activation or the activatable substance, not to exhibit a gap between the cavity 6 and the other cavity 8 through which the gaseous product 21 (FIG. 1b) might escape, thereby rendering the actuator unusable.

Figure 11:
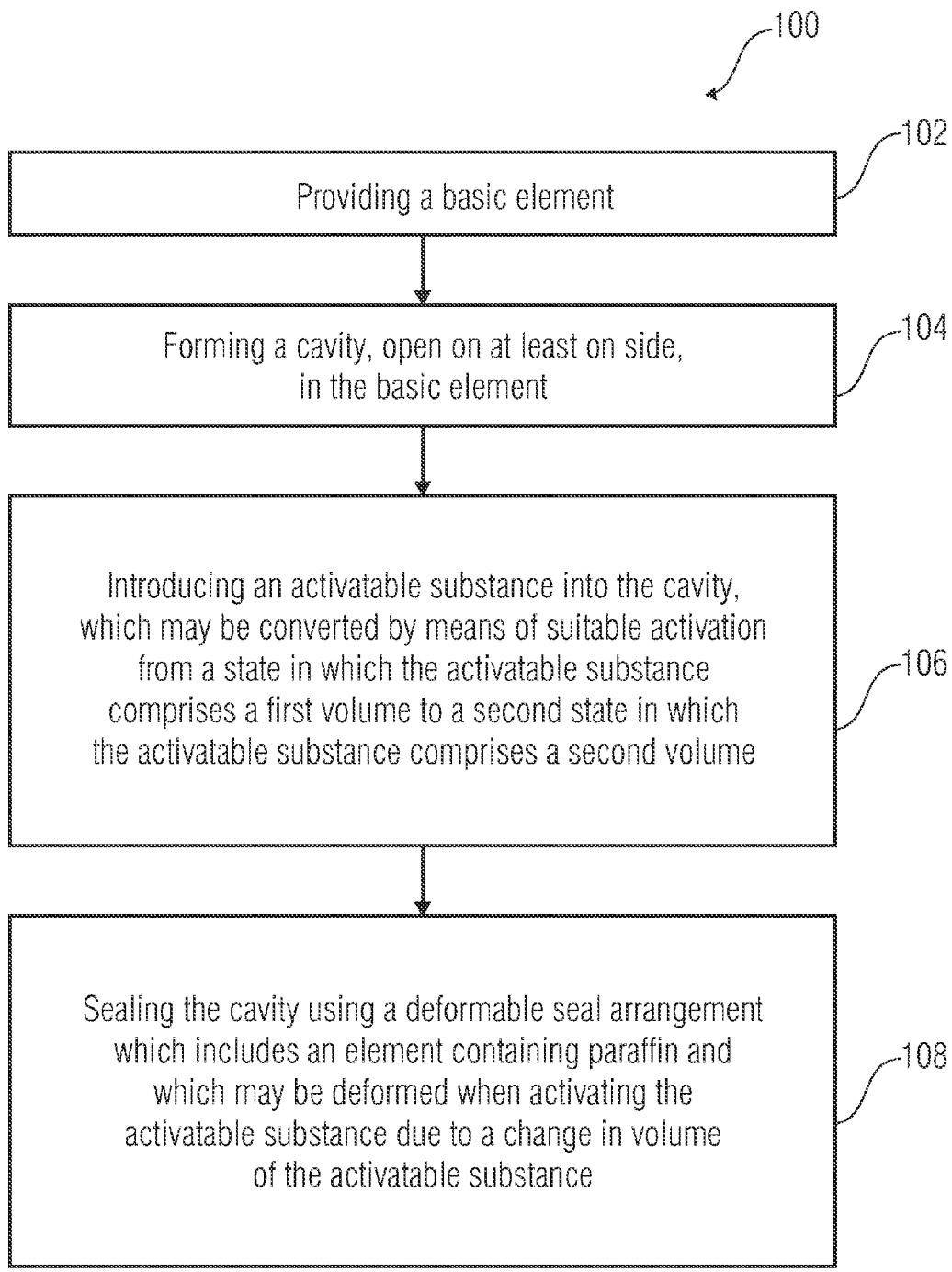
FIG. 11 shows a schematic flowchart of a manufacturing method in accordance with the teaching disclosed here.

FIG. 11 shows a schematic flowchart of a method 100 for manufacturing a fluidic actuator. A basic arrangement is provided during a process 102. The basic arrangement may be integral, such as, for example, in the form of a substrate 1. Alternatively, the basic arrangement may consist of several elements, such as, for example, the substrate 1 and a patterned film 10 or patterned adhesive tape such that the result is the basic arrangement as an assembly of layers. During another process 104, a cavity is formed in the basic arrangement, which, after finishing the process 104, is open at least on one side. Depending on how the basic arrangement is set up, the processes 102 and 104 may also coincide. Exemplarily, the cavity may be formed at the same time as applying the patterned film 10.

During another process 106 of the manufacturing method 100, an activatable substance 20 is introduced into the cavity 6. Depending on the type of activatable substance, introducing may be done by casting, pouring, injecting or a comparable filling method. Introducing may include metering the activatable substance in order for a future effect of the fluidic actuator (deflection, force, etc.) to be within a predetermined tolerance range.

The cavity 6, which is open at first, is sealed by a process 108 by arranging a deformable seal arrangement 30; 4 at the basic arrangement above the cavity. The seal arrangement 30; 4 includes an element containing paraffin. The seal arrangement may be pre-manufactured, exemplarily as a deformable film containing paraffin. However, it is also possible to create the seal arrangement during the process 108 by at first generating a paraffin layer which is arranged at least above the activatable substance 20 and maybe also in an area beyond. When needed, suitable masks, templates or printing screens may be used for defining the location and the shape of the paraffin layer. Coating with the paraffin layer may exemplarily be done by a spraying process, dip coating process, coating process or printing process. After having applied the paraffin layer, an optional expandable film may be applied on the surface of the paraffin layer. The order of the paraffin layer and the expandable film may also be reversed such that at first the expandable film for sealing the cavity is applied, and after that the paraffin layer is applied onto the expandable film.

During future operation of the fluidic actuator, when activating the activatable substance 20, the deformable seal arrangement is deformed due to a change in volume in the activatable substance.

Although some aspects have been described in connection with a device, it is to be understood that these aspects also represent a description of the corresponding method such that an element or component of a device is to be interpreted also as a corresponding method step or as a characteristic of a method step. In analogy, aspects having been described in connection with a method step or as a method step also represent a description of a corresponding block or detail or characteristic of a corresponding device.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A fluidic actuator comprising:
   a basic arrangement including at least one cavity formed therein;
   an activatable substance within the cavity, configured to be converted at least partly to one or more different substances by suitable activation or, when activated, changes its state of aggregation at least partly, thereby causing a change in pressure in the cavity; and
   a deformable seal membrane mechanically affixed to the basic arrangement to seal the at least one cavity and prevent an escape of the activatable substance from the cavity, wherein
   the seal membrane includes a film including a paraffin portion or an expandable film including a paraffin layer on at least one main surface and may be deformed when activating the activatable substance due to the change in pressure; and
   the film or the expandable film is mechanically affixed to the basic arrangement.

2. The fluidic actuator in accordance with claim 1, wherein the expandable film includes at least one of the following materials: natural rubber, silicone rubber, butyl rubber, and polybutadiene.

3. The fluidic actuator in accordance with claim 1, wherein the paraffin layer is arranged on the expandable film in the area of the at least one cavity.

4. The fluidic actuator in accordance with claim 1, wherein the paraffin layer is arranged on the expandable film laterally over the entire surface of the expandable film.

5. The fluidic actuator in accordance with claim 1, wherein the seal membrane includes an elastomer layer provided with the paraffin layer.

6. The fluidic actuator in accordance with claim 1,
   wherein the film including the paraffin portion or the expandable film including the paraffin layer is a dispensed or printed element applied directly onto the activatable substance.

7. The fluidic actuator in accordance with claim 1, wherein the seal membrane has dimensions which are greater than dimensions of an opening of the cavity to be sealed such that an edge of the seal membrane projects beyond the opening of the cavity.

8. The fluidic actuator in accordance with claim 1, wherein the seal membrane includes a groove pattern or a wave pattern.

9. The fluidic actuator in accordance with claim 8, wherein:
   the seal membrane includes a membrane made of at least one of: metal, thermoplastic, thermosetting plastic, and elastomer, and
   the membrane is provided with a layer at least partly including paraffin as the film including the paraffin portion or the expandable film including the paraffin layer.

10. The fluidic actuator in accordance with claim 1, wherein the basic arrangement includes a floor element and a patterned layer which bound the cavity together with the seal membrane.

11. The fluidic actuator in accordance with claim 1, further comprising at least another cavity which is separated from the first cavity by the seal membrane.

12. The fluidic actuator in accordance with claim 1, wherein the fluidic actuator is an electrolytic actuator and the activatable substance is an electrolyte.

13. The fluidic actuator in accordance with claim 12, wherein the electrolyte is a water-based electrolyte.

14. The fluidic actuator in accordance with claim 12, wherein the electrolyte is present in a liquid state, a condensed state, as a gel or in a pasty state.

15. The fluidic actuator in accordance with claim 1, wherein the seal membrane includes a water vapor permeability of less than 10 $g/m^2d$ and, advantageously, less than 1 $g/m^2/d$.

16. The fluidic actuator in accordance with claim 1, wherein the seal membrane includes an expandability of more than 100%, advantageously more than 300%.

17. The fluidic actuator in accordance with claim 1, wherein the seal membrane includes a yield stress of less than 20 MPa, advantageously less than 5 MPa.

18. The fluidic actuator in accordance with claim 1, wherein the basic arrangement includes a printed circuit board.

19. The fluidic actuator in accordance with claim 1, wherein the fluidic actuator is a pump or a valve included in a microfluidic system.

20. The fluidic actuator in accordance with claim 1, further comprising:
   a plurality of cavities formed in the basic arrangement, and
   a plurality of seal membranes configured to each seal one of the plurality of cavities.

21. The fluidic actuator in accordance with claim 20, wherein the plurality of seal membranes is implemented as a continuous seal unit.

22. A method for manufacturing a fluidic actuator, comprising:
   providing a basic arrangement;
   forming a cavity, open on at least one side, in the basic arrangement;
   introducing an activatable substance into the cavity, configured to be converted at least partly to one or several different substances by suitable activation or, when activated, changes its state of aggregation at least partly, thereby causing a change in pressure in the cavity; and
   sealing the cavity using a deformable seal membrane by mechanically affixing the deformable seal membrane to the basic arrangement to prevent an escape of the activatable substance from the cavity; wherein
   the deformable seal member includes a film including a paraffin portion or an expandable film including a paraffin layer on at least one main surface and may be deformed when activating the activatable substance due to the change in pressure; and
   the method further includes a step of mechanically affixing the film or the expandable film to the basic arrangement.

* * * * *